UNITED STATES PATENT OFFICE.

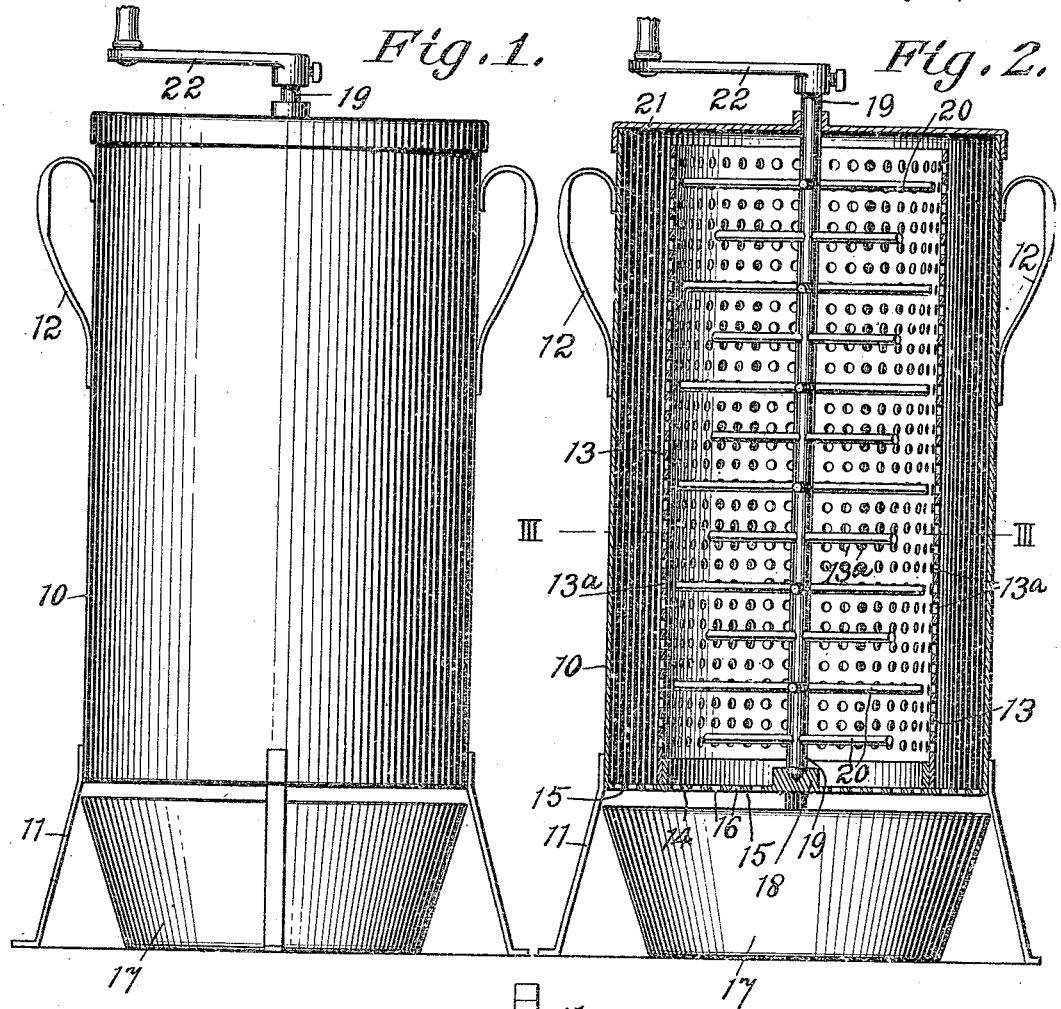

EMMA M. NEWTON, OF NEW YORK, N. Y.

STRAINER.

959,581.  Specification of Letters Patent.  Patented May 31, 1910.

Application filed November 5, 1909. Serial No. 526,396.

*To all whom it may concern:*

Be it known that I, EMMA M. NEWTON, a citizen of the United States, and a resident of New Brighton, Staten Island, county of Richmond, city and State of New York, have invented certain new and useful Improvements in Strainers, of which the following is a full, clear, and exact description.

This invention relates more particularly to a fruit or vegetable strainer or device.

The primary object of the invention is to provide a simple and efficient device which is adapted to hold the material from which the juice or liquid is to be extracted and which has simple means for separating the juice from the material so that the juice may be collected and used for making jelly or for other purposes.

Another object of the invention is to provide a simple and efficient device particularly adapted for household use, and which is so constructed that the material may be readily placed therein or parts thereof removed for cleaning or for the removal of the material.

A further object of the invention is to provide a simple and efficient device which may be readily made and assembled and which may be used for various purposes.

With these and other objects in view, the invention will be hereinafter more particularly described with reference to the accompanying drawings, which form a part of this specification, and will then be pointed out in the claim at the end of the description.

In the drawings, Figure 1 is a side elevation of one form of device embodying my invention. Fig. 2 is a vertical section of the device; and Fig. 3 is a sectional plan view taken on the line III—III of Fig. 2.

The device has an outer casing 10 which is adapted to be supported by the legs 11 of any desired height, and said casing may be provided with one or more handles 12 by which the same may be readily transported.

A casing or receptacle 13 is located within the casing 10 and this receptacle may be cylindrical in form and has openings 13ª in its body so that the liquid or juice may pass therethrough, and at the lower end the said inner casing is adapted to fit about an annular flange 14 projecting from the base or bottom 15 of the outer casing 10. This bottom 15 has openings 16 on the outside and under the inner casing for the passage of liquid, and under the outer casing 10 between the legs 11 may be arranged a receptacle, as 17, to receive the juice or liquid as it passes through the openings 16.

The base 15 may have a boss 18 which is adapted to serve as a bearing for a vertically arranged rod 19. This rod forms a part of the liquid separating device, and projecting out from said rod are substantially radial and curved arms 20 which are so positioned with relation to each other that as the rod 19 of the separating device is rotated, the said arms will cause the juice to be forced from the material and as the same is forced therefrom, it will pass through the bottom 15 and out through the openings of the inner casing to be received by the receptacle 17 to be used for any purposes according to the nature of the material being acted upon. The rod 19 is held at one end to rotate in a cover 21, and this cover is adapted to fit and close the upper end of the casing 10, and at the outer end of the rod of the mixing and separating device is a handle 22 by which the said device may be rotated. It will be seen that by removing the cover and the rotary separating device the material may be readily placed within the inner casing 13, and when the rod 19 and arms are rotated, the juice or liquid will be caused to pass into the receptacle 17.

From the foregoing it will be seen that a simple and efficient device is provided whereby fruit, vegetables or the like may have the juice or liquid removed therefrom and the juice properly strained; that said device is simple in construction and is readily arranged for placing the material therein or for cleaning purposes; and that said device comprises means for extracting the juice and for collecting the same; and that said device may be readily and cheaply made and assembled.

Having thus described my invention, I claim as new and desire to secure by Letters Patent:—

A device of the class described, comprising a plurality of cylindrical members, one of said members being open at both ends and the walls thereof perforated, the other member adapted to incase said first mentioned member and having a perforated base and an imperforate top, an annular upwardly extending flange formed on the interior portion of said base and adapted to engage the lower edge of the first mentioned member and retain the same in position spaced from the walls of the other member, a bearing formed on the base, a shaft provided with agitating means rotatably mounted in said bearing and in the top of the first mentioned member substantially as described.

This specification signed and witnessed this 3rd day of November A. D. 1909.

EMMA M. NEWTON.

Witnesses:
W. A. TOWNER, Jr.
M. DINNHAUPT.